United States Patent [19]

Boschetti

[11] 3,929,983

[45] Dec. 30, 1975

[54] COMPOSITIONS AND METHODS OF KILLING RODENTS USING (DIPHENYL ACETYL)-2 INDANE DIONE-1,3

[75] Inventor: Eugène Boschetti, Venissieux, France

[73] Assignee: Lipha Lyonnaise Industrielle Pharmaceutique, Lyon, France

[22] Filed: June 11, 1974

[21] Appl. No.: 478,230

Related U.S. Application Data

[63] Continuation of Ser. No. 244,930, April 17, 1972, abandoned.

[30] Foreign Application Priority Data

Apr. 21, 1971 France .............................. 71.14065

[52] U.S. Cl. .................................. 424/17; 424/331
[51] Int. Cl.² ...................... A01N 9/24; A01N 17/14
[58] Field of Search ............................. 424/17, 331

[56] References Cited
UNITED STATES PATENTS

| | | | |
|---|---|---|---|
| 2,687,365 | 8/1954 | Link | 424/17 |
| 2,754,302 | 7/1956 | Gysin et al. | 424/17 X |
| 2,957,804 | 10/1960 | Shuyler | 424/17 X |
| 3,113,071 | 12/1963 | Derse et al. | 424/17 |
| 3,258,396 | 6/1966 | Schaar | 424/17 |
| 3,260,645 | 7/1966 | Banziger et al. | 424/17 |

FOREIGN PATENTS OR APPLICATIONS

| | | | |
|---|---|---|---|
| 1,082,772 | 9/1967 | United Kingdom | 424/281 |
| 2,055,941 | 5/1971 | France | |

*Primary Examiner*—Frederick E. Waddell
*Assistant Examiner*—Allen J. Robinson
*Attorney, Agent, or Firm*—Browdy and Neimark

[57] ABSTRACT

The invention relates to rodenticide compositions.

These novel compositions are constituted by oily solutions of (diphenyl acetyl)-2-indane dione-1,3.

The said oily solutions permit the impregnation of bait by impregnating a support structure consumable by the rodents, such as rats, mice and the like.

8 Claims, No Drawings

COMPOSITIONS AND METHODS OF KILLING RODENTS USING (DIPHENYL ACETYL)-2 INDANE DIONE-1,3

This is a continuation of application Ser. No. 244,930, filed Apr. 17, 1972, now abandoned.

The present invention relates to novel compositions of rodenticide activity, the purpose of which is to destroy rodents such as rats, mice and the like.

It is known that various derivatives of the indane-diones-1,3 have the property that they diminish the prothrombin level of the blood and are therefore utilizable as a rodenticide since they bring about in rodents, which have consumed nourishment to which these products have been added, an increased degree of mortality due to internal hemorrhage.

However, as a rule, the anticoagulant substance is prepared in the form of a mixture within a pulverulent substance, such as talcum or a flour, and is then deposited on a support which is consumable by the rodents, such as previously lubricated grain. After a certain period of storage and during manipulation, it has been found that the grain only very partially retains the pulverulent product, as described hereinabove. The bait becomes heterogeneous, the toxic substance accumulating at the bottom of the packaging envelope. In this way, the bait offered to the rodents loses its rodenticidal activity. When the support structure is not a cereal, but is bread or biscuits, the result is the same.

According to the invention there have been found novel rodenticide compositions which are particularly stable in time and have relatively high concentrations, permitting the impregnation of bait based on cereals, even after several years of storage. The bait prepared from the novel rodenticide compositions is perfectly homogeneous.

The rodenticide compositions of the invention are chemically stable, in contradistinction to the alcoholic solutions of the derivatives of 1,3-indane diones. It is known that the alcoholic solutions of 2-phenyl-1,3-indane dione which have been deeply colored red by enolyzing the product, lose their color after only a few weeks of storage by oxidation of the dissolved molecule.

Furthermore, bait prepared from the novel rodenticide compositions are particularly "appetizing".

According to the invention, the stable rodenticide compositions are constituted by oily solutions of (diphenyl acetyl)-2-indane dione-1,3 having the formula

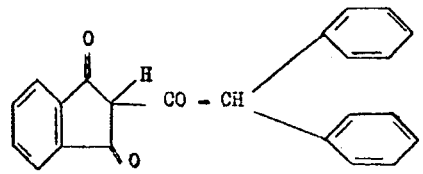

It has been found that (diphenyl acetyl)-2-indane-dione-1,3 ("Diphacinone") exhibits an adequate degree of solubility in oils which renders possible the preparation of oily concentrates which are particularly stable in time, at concentrations which may attain as much as 2.5 g/l.

According to the invention, preferably the Diphacinone concentration of the said oily solutions ranges between 0.1 and 2.5 g/liter.

The oils suitable for the preparation of the rodenticide compositions may be mineral, vegetable or animal oils.

According to one object of the invention, the (diphenyl acetyl)-2-indane-dione-1,3 is dissolved in the hot state in a predetermined quantity of oil and then the hot solution is mixed with the residual quantity of oil.

These oily concentrates according to the invention permit the preparation of a bait based on cereals, such as wheat, maize, barley, etc., or any other substrate (support structure) consumed by the rodents, such as apples, carrots, etc. They are stable after several years of storage and permit the impregnation of the bait.

According to a variant of the invention, the oily solutions of "Diphacinone" may be colored with coloring substances which are soluble in oil. It has been found that these oily solutions penetrate into the very "heart" of the cereals utilized as substrate, affording a perfectly homogeneous bait.

According to a further variant of the invention, bait having a high poison concentration may be prepared by impregnating the substrate consumable by the rodents with hot oily solutions of Diphacinone the concentration of which may attain as much as 5 g/liter.

It has also been surprising to ascertain that the bait prepared from oily solutions of Diphacinone are particularly "appetizing".

In fact, it has been verified on batches of Wistar rats that grain impregnated with oily solutions of Diphacinone was very well consumed by the rodents.

Hereinbelow, there is given by way of non-limitative example, an example of the preparation of an oily concentrate:

2 g of (diphenyl acetyl)-2-indane-dione-1,3 (F = 146°–147°C) are hot solubilized at approximately 100°C in 500 ml of Vaseline oil (liquid petrolatum). The hot solution is mixed with 500 ml of Vaseline oil containing a coloring substance which is soluble in the oil. After cooling, there is obtained a solution containing 2 g/liter of Diphacinone.

Baits on cereals such as pearl barley, wheat, crushed maize, etc. are prepared for example in the proportion of 25 ml of oily concentrate per kg of cereal, i.e. with a concentration of 0.05% (0.05 g of Diphacenone per kg of cereal).

The raticide activity (mortality for a predetermined consumption) has been studied in accordance with the test procedure defined at the London Conference on the combatting of harmful rodents of October 1958. The bait is prepared by impregnation, with a solution of Diphacinone in paraffin oil, of crushed wheat.

The results obtained on batches of white adult rats are summed up in the following table:

| Concentration in g of "Diphacinone" per 1000 g of wheat | Mortality |
|---|---|
| 0.07 | 10/10 |
| 0.06 | 9/10 |
| 0.05 | 6/10 |

What I claim is:

1. A composition having rodenticidal activity comprising an oily solution of (diphenyl acetyl)-2 indane dione-1,3 having the formula:

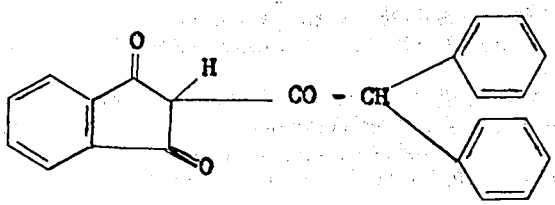
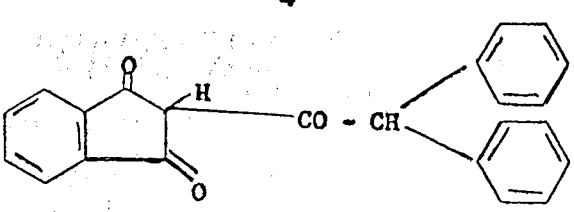

at a concentration between 0.1 and 2.5 g/liter, wherein said oil is liquid petrolatum.

2. A process for the preparation of the rodenticidal composition in accordance with claim 1 comprising:
   dissolving a quantity of (diphenyl acetyl)-2 indane dione-1,3 at a temperature of about 100°C. in a portion of that quantity of liquid petrolatum necessary to make a concentration of 0.1 to 2.5 g/liter; and
   mixing said solution with the remainder of said oil.

3. A rodenticidal bait comprising a support of wheat, maize, barley, apples or carrots homogeneously impregnated with the composition of claim 1 in the proportion of about 25 ml. of composition per kg. of support.

4. A process of killing rodents comprising applying to an area where rodents assemble, the rodenticidal bait of claim 3 in a rodentically effective amount.

5. A rodenticidal composition having a high poison concentration comprising an oily solution of (diphenyl acetyl)-2 indane dione-1,3 having the formula:

at a concentration between 2.5 and 5 g/liter, wherein said oil is liquid petrolatum.

6. A process for the preparation of the rodenticidal composition of claim 5 comprising:
   dissolving a quantity of (diphenyl acetyl)-2 indane dione-1,3 at a temperature of about 100°C. in a portion of that quantity of liquid petrolatum necessary to make a concentration of 2.5 to 5 g/liter; and
   mixing said solution with the remainder of said oil.

7. A rodenticidal bait comprising a support of wheat, maize, barley, apples or carrots homogeneously impregnated with the composition of claim 5 in the proportion of about 25 ml. of composition per kg. of support.

8. A process of killing rodents comprising applying to an area where rodents assemble, the rodenticidal bait of claim 7 in a rodentically effective amount.

* * * * *